United States Patent
Liou

(10) Patent No.: US 9,542,679 B2
(45) Date of Patent: Jan. 10, 2017

(54) IMPLEMENTATION METHOD FOR AN IDENTIFICATION SYSTEM USING DYNAMIC BARCODE

(71) Applicant: Chung Hwa International Communication Network Co., ltd., New Taipei (TW)

(72) Inventor: Kenneth Liou, New Taipei (TW)

(73) Assignee: CHUNG HWA INTERNATIONAL COMMUNICATION NETWORK CO., LTD., New Taipei (TW)

( * ) Notice: Subject to any disclaimer, the term of this patent is extended or adjusted under 35 U.S.C. 154(b) by 0 days.

(21) Appl. No.: 14/696,820

(22) Filed: Apr. 27, 2015

(65) Prior Publication Data

US 2016/0314455 A1 Oct. 27, 2016

(51) Int. Cl.
| | | |
|---|---|---|
| *G06F 17/00* | (2006.01) | |
| *G06K 5/00* | (2006.01) | |
| *G06K 15/00* | (2006.01) | |
| *G06Q 20/32* | (2012.01) | |
| *G06K 19/06* | (2006.01) | |

(52) U.S. Cl.
CPC ..... *G06Q 20/3274* (2013.01); *G06K 19/06112* (2013.01); *G06Q 20/3278* (2013.01)

(58) Field of Classification Search
USPC ................ 235/375, 380, 383, 441, 451, 492
See application file for complete search history.

(56) References Cited

U.S. PATENT DOCUMENTS

| | | | |
|---|---|---|---|
| 9,111,270 B2* | 8/2015 | Fujisawa ............... | G06Q 20/204 |
| 2010/0279610 A1* | 11/2010 | Bjorhn .................... | G06Q 20/20 455/41.2 |
| 2012/0091202 A1* | 4/2012 | Cohen ..................... | G06F 21/33 235/382 |
| 2013/0151359 A1* | 6/2013 | Fujisawa ............... | G06Q 20/204 705/17 |
| 2014/0084067 A1* | 3/2014 | Vanderhulst ......... | H04B 10/116 235/462.01 |
| 2015/0261962 A1* | 9/2015 | Mevec ................ | G06F 11/1448 726/26 |

* cited by examiner

*Primary Examiner* — Tuyen K Vo
(74) *Attorney, Agent, or Firm* — Bacon & Thomas, PLLC

(57) ABSTRACT

The implementation method for an identification system using dynamic barcode entails description for a system that comprises a smartphone, a barcode information access device on the merchant side, and a server of an identification agency. The implementation method described includes downloading a mobile application (app) for smartphone, and utilizing the app to upload identification information to server of the identification agency. When a user needs to be identified during a transaction, the aforementioned app is used to display two barcodes on the smartphone: one barcode represents the user's identification, and the other is a dynamic one that corresponds to the user's identification information and changes after a given time period. When both barcode information are read by barcode reader and send to the server of the identification agency, the said agency could easily compare its own information with the dynamically generated barcode information, which helps to distinguish whether the user is the original registrant.

13 Claims, 4 Drawing Sheets ized barcode reader devices that all businesses have,
IMPLEMENTATION METHOD FOR AN IDENTIFICATION SYSTEM USING DYNAMIC BARCODE

BACKGROUND OF INVENTION

Field of the Invention

This invention pertains to an identification barcode that contains identification information that is generated by an application of a smartphone, as well as a dynamic barcode that corresponds to identification information after a given period of time; the aforementioned barcodes are read by a barcode reader and sent to a server of an identification agency to be compared. The above process entails the implementation method for an identification system using dynamic barcode.

Brief Description of the Prior Art

If all transactions are conducted through the medium of cash, it is troublesome and time-consuming. Hence, in recent years, credit card, debit card, and electronic ticket are used instead; however, this gives rise to the problems of forgery and theft. In other words, the business world has yet to completely solve the need for a convenient and safe identification solution. In recent times, smartphones are gaining wider popularity and naturally people would like to use their smartphones as a tool to pay, namely using smartphones as electronic wallets and mobile payment. The core issue is also how to provide a convenient and safe user identification method. The industry has long set its eyes on NFC (Near Field Communication) as the mode of data communication and identification, but smartphones currently have three operating systems: iOS, Android and Windows, and this cause tremendous obstacle in reading for the readers. For instance, there isn't a NFC reader that can both scan Apple Pay and Google Wallet. As there are few customers initially, business owners are less willing to purchase additional NFC readers for each digital payment, and this begins a vicious cycle of less customers applying for electronic wallet and mobile payment as fewer businesses utilize NFC readers. In addition, smartphone companies such as Apple, telecommunication companies, and banks all want to gain a share of the electronic wallet market, but business owners are certainly unwilling to spend extra money on the procurement of NFC readers. The simplest solution to this problem is to adopt linear CCD (charge-coupled device) or CMOS (complementary metal-oxide-semiconductor) reader devices that all businesses have, which can directly scan barcode from customers' smartphones without the need for additional procurement. The barcode represents the customer's identification, and thus achieve our intended objective. However, if we only stop at that, the problem of forgery may happen frequently. Current methods employed in the market use encryption, and even barcodes can be encrypted by changing its shape. Since barcodes are password protected, the system manager will know how to decrypt the passwords. As time progresses, even though passwords are stored in the identification system, the likelihood that they are decrypted by unwanted parties can increase exponentially.

U.S. Pat. No. 8,931,703 "Payment cards and devices for displaying barcodes" is to display barcode on a single card, and its functionality pales in comparison with a smartphone. Further, cost is incurred in buying a costly electronic card, which takes up space to carry. It is unlikely to be accepted by consumers in general.

Other U.S. Pat. Nos. 8,600,883 and 8,862,513, both with same title "Mobile barcode generation and payment", involves the entry of mobile phone number and a fixed password or PIN (Personal Identification Number), which will then generate a barcode through a Payment Provider to determine the user's identification or card number. However, a fixed password or PIN is very vulnerable and fails to meet security requirements.

SUMMARY OF THE INVENTION

In view of the above problem, this invention primarily aims to provide an implementation method for a highly secure identification system that entails utilizing existing barcode readers of merchants, coupled with a smartphone and a server of an identification agency.

To achieve the above objectives, the implementation method for an identification system using a dynamic barcode as described by present invention primarily uses an identification barcode, which is coupled with a corresponding dynamic barcode that corresponds to the identification of the user and which changes after a given period of time. When both of these barcode information as displayed on a smartphone are read by a reader and sent to an identification server, the said server will generate corresponding dynamic barcode information when the identification agency receive a request for identification. By comparing both sides of the dynamic barcode, one can identify whether the user is the original registrant. The described dynamic barcode will change after a given time period (approximately one minute), and with this method, even the administrator will be unable to predict the next barcode. The old barcode information will no longer be stored at the identification agency, thus rendering it impossible to decipher. This method alleviates the issues of recording old information, deciphering and forgery. Another feature of this invention is that when customers use this dynamic barcode, one doesn't need to connect to the internet; the dynamic barcode will be generated by the smartphone app based on a time code, and doesn't need to be send back to the identification agency for generation. This gives the users great convenience.

BRIEF DESCRIPTION OF ACCOMPANYING DRAWINGS

DETAILED DESCRIPTION OF PREFERRED EMBODIMENTS

Figure 1:
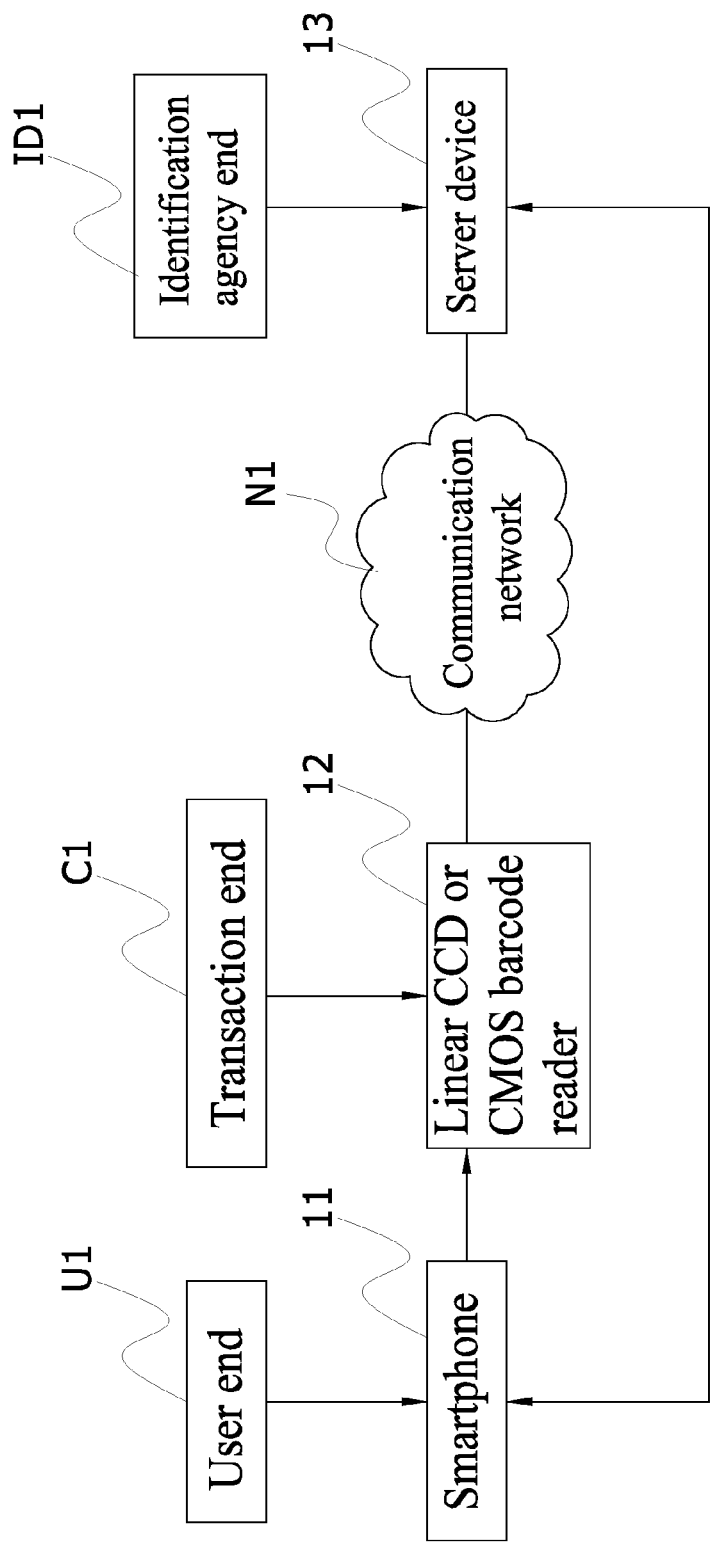
FIG. 1 is diagram showing the system architecture of present invention

Referring to FIG. 1, the identification system using dynamic barcode as described by this invention consists primarily of a smartphone 11 of a user end U1, a linear CCD (charge-coupled device) or CMOS (complementary metal-oxide-semiconductor) barcode reader 12 of a transaction end C1, and a server device 13 of an identification agency end ID1. In particular, the described transaction end C1 and identification agency end ID1 can form an information link through a communication network N1 (for example the internet or 3G/4G mobile communication). In other words, C1 can access barcode information as read by the linear CCD or CMOS barcode reader and send to server device 13 of ID1 through all forms of N1, which facilitates the process of identification. Further, C1 generally refers to ordinary merchants, and ID1 refers to businesses, banks or financial institutions that provide identification.

Figure 2:
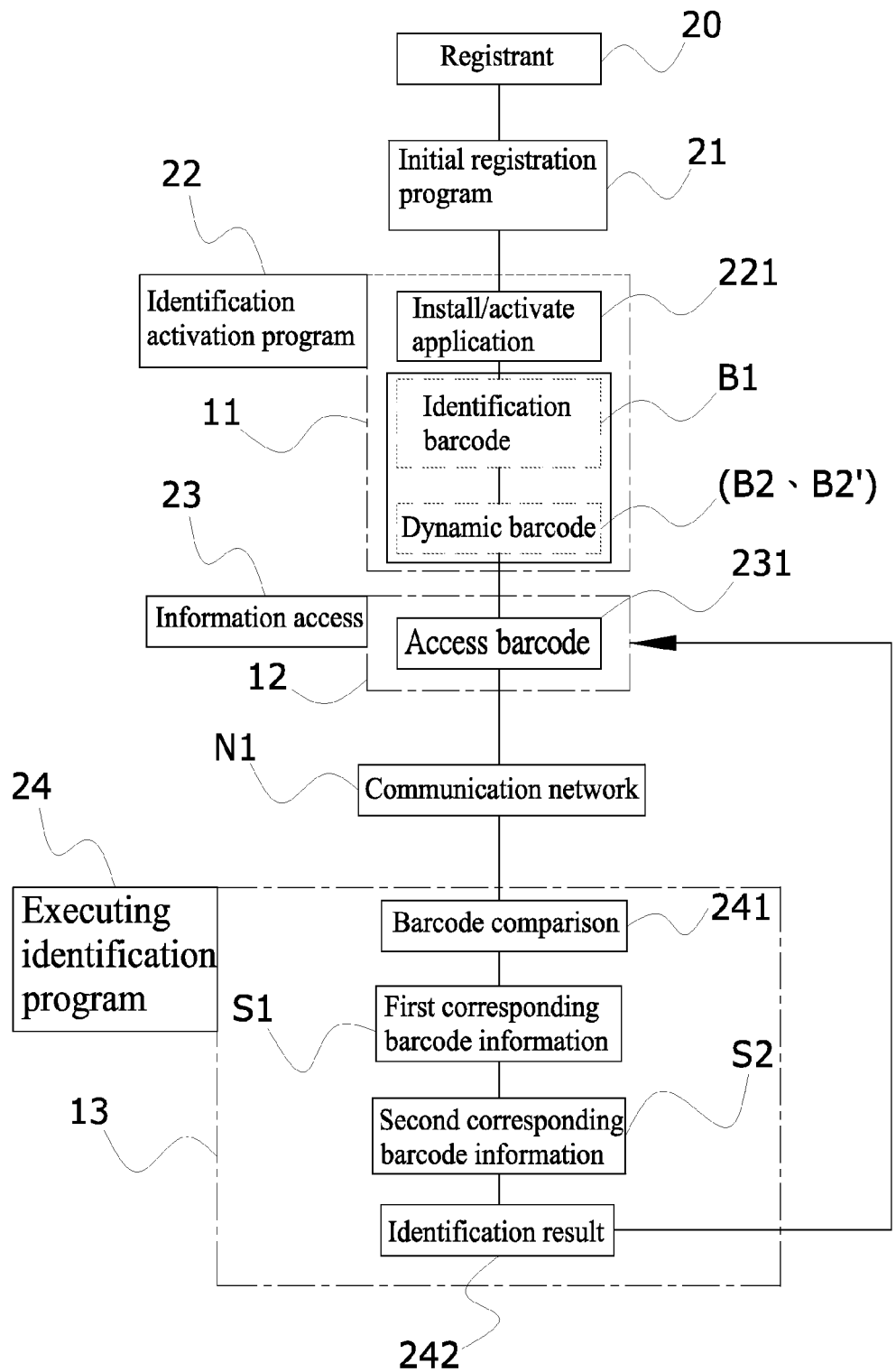
FIG. 2 is diagram showing the procedure of the implementation method of present invention

Referring to FIG. 2 and please as depicted in FIG. 1, the process for the implementation method of this invention includes:

Registrant 20 executes an initial registration process 21: A registrant 20 (user) uses his smartphone 11 and installs a mobile application (app). The said app is an app that allows the process of identification. After installation, the user can begin the process of registration. The registration process involves server device 13 of ID1 confirming the mobile phone number and activation code from smartphone 11. When smartphone 11 completes registration with ID1, it can proceed with identification in future transactions.

As aforementioned, when a user wishes to proceed with the identification process, the implementation method is as follows:

An identification activation program 22: When a user installs and activates app 221 on smartphone 11, the said app will produce an identification barcode B1 and a dynamic barcode (B2, B2'), which are displayed on the screen of the smartphone. The generation of the said identification barcode B1 and dynamic barcode (B2, B2') doesn't need internet access and is generated by the smartphone's app using time code. It doesn't need to send information back to the identification agency to generate the barcode. In other words, the generation of the barcode is not affected by the absence of internet access, and is therefore very convenient to the users;

An information access program 23: The user presents barcode from the aforementioned smartphone 11 at the transaction end C1 (for example, merchants). The transaction end C1 uses its pre-established linear CCD or CMOS barcode reader 12 to access barcode 231 (identification barcode B1 and dynamic barcode B2). After access, the identification barcode B1 and dynamic barcode B2 are sent through communication network N1;

An identification execution program 24: Following the aforementioned program, when the server device 13 of identification agency ID1 receives identification barcode B1 and dynamic barcode B2 from transaction end C1, it will begin barcode comparison 241. First, it will use individual barcode information S1 and compares it with identification barcode B1; when both information matches, it will then generate a dynamic barcode that corresponds with format of the app used by smartphone 11—the barcode will be time stamped with three time codes: front (a time frame prior to the identification), middle (the actual time of identification, similar to the time of smartphone 11), and back (a time frame after the identification). The generated dynamic barcode forms the second corresponding barcode information S2. The server device 13 then compares this second set of corresponding barcode information S2 with received dynamic barcode B2 to confirm if the dynamic barcode B2 matches any of the three corresponding barcode as encoded in S2. A match if confirmed if any of the three corresponding barcode matches with dynamic barcode B2, and an identification result 242 is generated. If the aforementioned comparison matches, then the identification process is considered "successful", if any of the items failed, then the identification process is "unsuccessful". As mentioned, when the identification result 242 is generated, server device 13 will send the result back to linear CCD or CMOS barcode reader 12 of the transaction end C1 to allow C1 to determine whether the user is the original registrant. Identification agency ID1 and smartphone 11 will generate an identical dynamic barcode B2 at the same time, and the reason for an earlier corresponding barcode is to prevent any delay in communication network N1. The need for another later corresponding barcode is to avoid any time lag between smartphone 11 and identification agency ID1.

Figure 3:
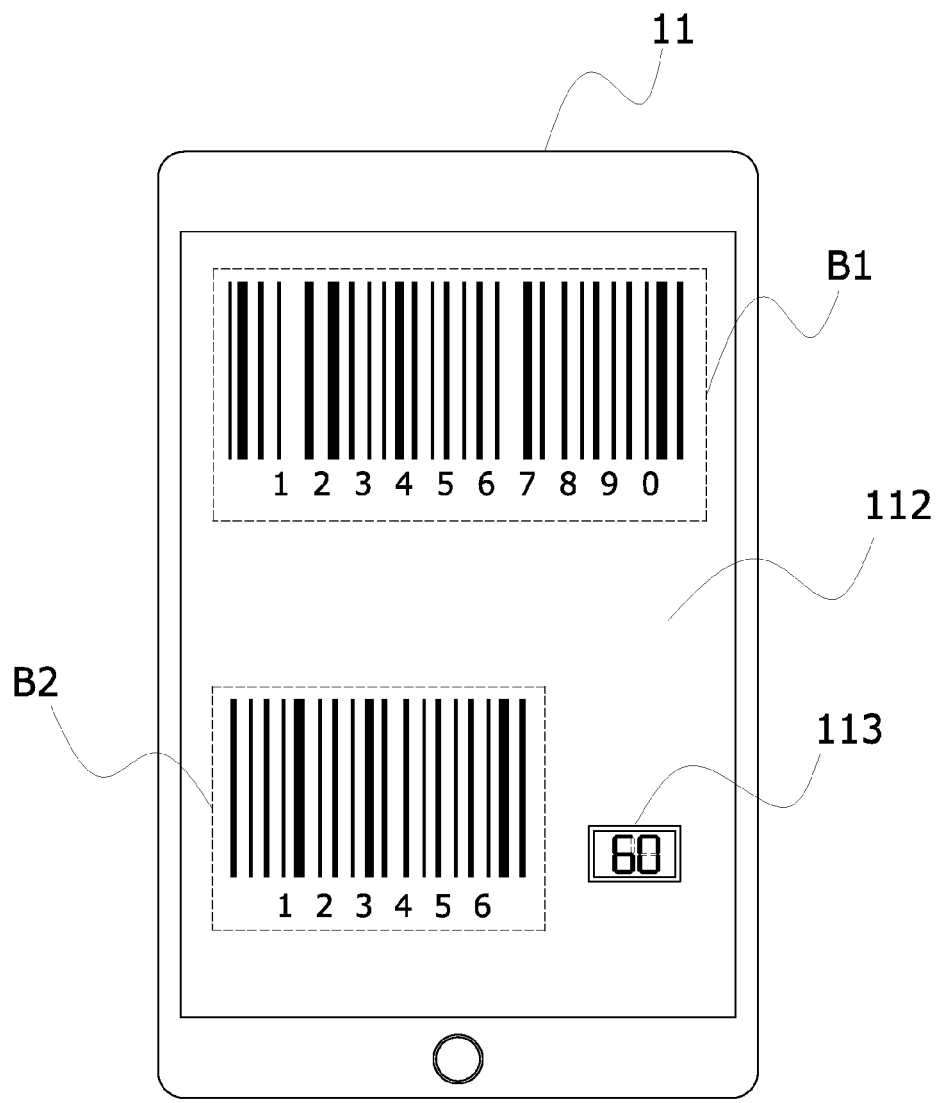
FIG. 3 is a schematic view of the embodiment (I) showing the implementation of the present invention.
Figure 4:
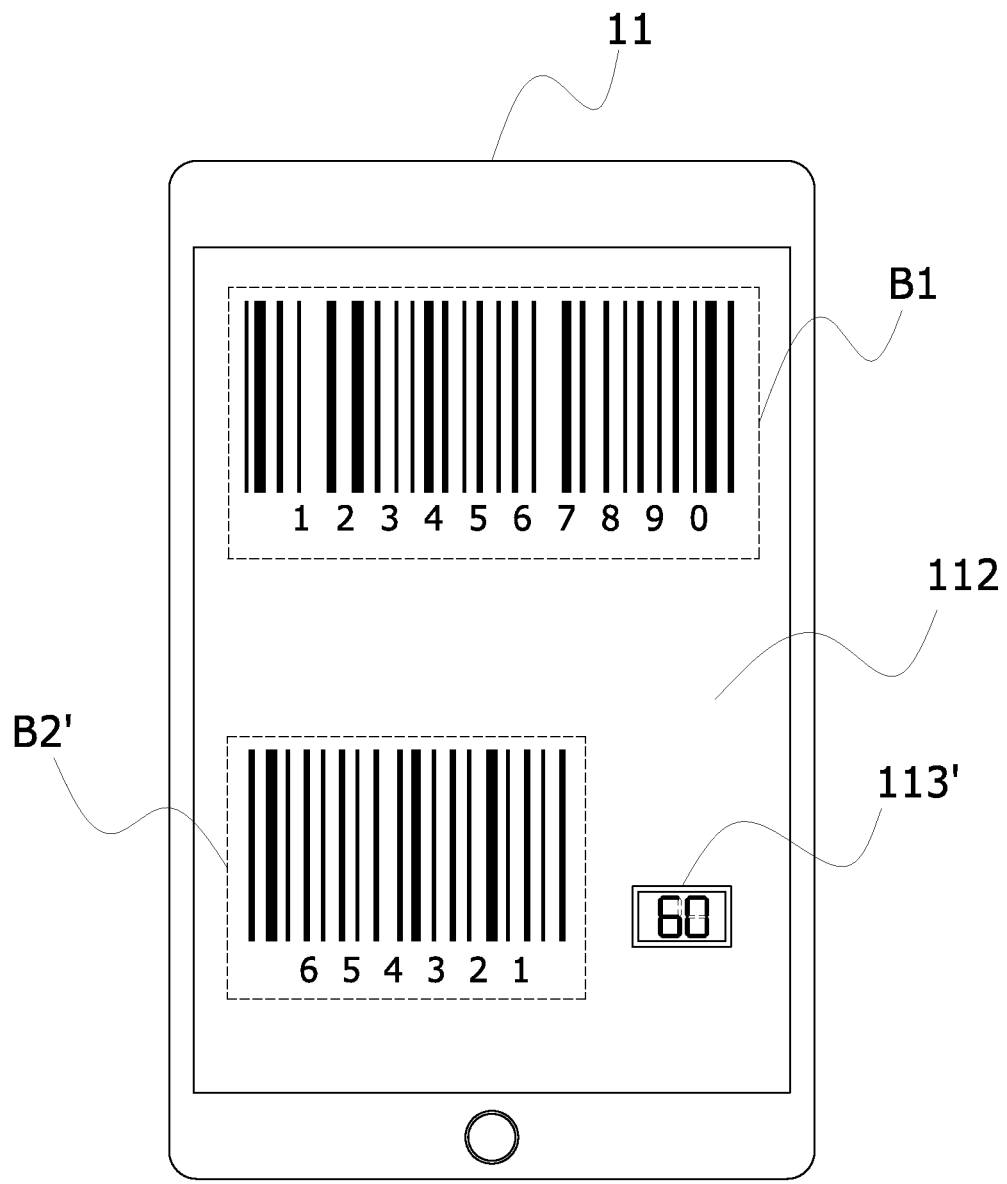
FIG. 4 is a schematic view of the embodiment (II) showing the implementation of the present invention.

Please refer to FIG. 3. As depicted, smartphone 11 has a display screen 112. When the identification activation program 22 as described in FIG. 2 is executed by app, display 112 will show both identification barcode B1 and dynamic barcode B2. Further, as shown in the diagram, dynamic barcode B2 will change after a certain period of time; in FIG. 3, display 112 will simultaneously show a timer zone 113. Timer zone 113 will begin countdown after the display of identification barcode B1 and dynamic barcode B2. The unit for countdown could be seconds in this instance (60 seconds), but is not limited to such. Please also refer to FIG. 4, which shows the change of dynamic barcode B2 to B2' after a certain period of time (in this instance, 60 seconds). Timer zone 113' also restarts its countdown. Therefore, dynamic barcode B2 will immediately disappear after comparison or expiration of countdown timer. When server device 13 of identification agency end ID1 generates a dynamic barcode B2 and compares it, the barcode will automatically disappear regardless of the result. At the same period of time, for a similar user, any dynamic barcode will only be allowed once during the identification process. Therefore, even if the barcode is stolen, theft is highly unlikely; further, the generation of dynamic barcode B2 utilizes a special kind of algorithm that is very random in nature, and can't be deciphered using fixed methods.

From the above discussion, this invention primarily utilizes a dynamic barcode as an identification system, and is composed of a smartphone that can generate and display two dynamic barcode information that runs on an app on the user end, a linear CCD or CMOS barcode information access device on the transaction end, and a server device of an identification agency. In particular, the first corresponding barcode information generated by the app is the only identification information that represents the user; the second barcode information corresponds to the identification information that will change after a given period of time. The server device of the identification agency end can generate the same change at the same time. The practical application requires a user to download and install the corresponding application (app), and to complete registrant process as a member on the server device of the identification agency end. When the user wishes to proceed with identification during a transaction, he/she runs this app, and without the need to be online (or part of any communication network), the smartphone can display the aforementioned two barcode information. At the transaction end, a linear CCD or CMOS barcode information access device will read the two barcode information on the smartphone display, and simultaneously send both of the barcode information to the server device of the identification agency end to confirm identification. The server device stores same information as the identification registration information on the smartphone and a dynamic barcode generation method. During the process of identification, comparison can be made regarding the consistency of the said information. The aforementioned identification process refers to the storage of first corresponding barcode information that matches the said identification barcode. When the server device receives the identification barcode, it will generate second corresponding barcode information with front, middle and back time frames. The server device will then compare the received dynamic barcode information with the second corresponding barcode information to confirm if the dynamic barcode matches any of the three corresponding barcodes within the second corresponding barcode information. If there is a match, it can be confirmed that the user is the original registrant, and successful comparison information will be sent back to the transaction end; else, a failed comparison information will be sent; thus, this completes the identification process. Based on the above discussion, it is evident that even if the barcode is stolen by a hacker, the stolen information can't be used, because an algorithm is needed to confirm the correct dynamic barcode information; further, any distinctive feature of this invention is that the customer doesn't need internet access for confirmation, because the barcodes are generated by the app of the smartphone using a time sequence method and doesn't require the information to be sent to the identification agency to generate barcode; this is very convenient to the customer. Based on the above discussion, after this invention is applied on a practical level, the process of identification is possible using existing barcode information access device of merchants, coupled with a smartphone and server of an identification agency; no additional hardware equipment need to be procured. The entire process is very convenient and highly secure, and consequently achieves the final objective of implementing an identification system using dynamic barcode.

Nonetheless, the aforementioned scenario is just an instance of the more practical application of this invention, and is not a limited discussion of the scope of application of this invention; Equivalent variations and modifications conducted by persons skilled in the art without departing from the spirit and scope of the present invention should be considered to be still within the scope of the present invention.

What is claimed is:

1. An implementation method for an identification system using dynamic barcode, including:
   a step of executing an identification program via a server provided by an identification agency wherein a user first utilizes a smartphone to register with user identification information through the identification agency, while installing an identification app that allows the smartphone to generate barcode information including two barcodes simultaneously, the two barcodes including an identification barcode generated with the user identification information, as well as a dynamic barcode; and wherein the two barcodes are shown on a display of the smartphone and correspond to the user identification information, and the dynamic barcode is automatically generated after a given period of time;
   a step of accessing the barcode information, wherein a linear CCD or CMOS barcode reader on a transaction end reads the identification barcode and the dynamic barcode shown on the smartphone display; and the identification barcode and the dynamic barcode are sent to the identification agency through a communication network after reading of the identification barcode and the dynamic barcode is completed;
   a step of identification, wherein when the server of the identification agency receives the identification barcode of the user, a comparison of data read from the dynamic barcode with information in a stored identification database will be carried out and after there is a match, the server will simultaneously generate dynamic barcode information including three dynamic barcodes that correspond to front, middle, and back time frames; and wherein the server will then receive the dynamic barcode from the user, which will be used to compare with any one of the three simultaneously generated dynamic barcodes to see if there is a match with the dynamic barcode received from the user to determine whether the user is an original registrant.

2. The implementation method for an identification system using dynamic barcode as claimed in claim 1, wherein when the dynamic barcode information generated by the identification agency matches the mode of the dynamic barcode generated by the smartphone, the dynamic barcode is randomly generated using a special algorithm, which renders it impossible to guess using specific rules.

3. The implementation method for an identification system using dynamic barcode as claimed in claim 1, wherein if the identification barcode information received by the identification agency does not match after comparison, the transaction end will be notified of the failure.

4. The implementation method for an identification system using dynamic barcode as claimed in claim 1, wherein the identification agency will only generate the three corresponding dynamic barcodes that correspond to the front, middle, and back time frames after receiving said identification barcode information and having a matching comparison.

5. The implementation method for an identification system using dynamic barcode as claimed in claim 1, wherein the middle dynamic barcode represents the dynamic barcode information generated at the same time as the smartphone at a particular time; the front dynamic barcode represents the dynamic barcode information generated before that particular time; the back dynamic barcode represents the dynamic barcode information generated after that particular time.

6. The implementation method for an identification system using dynamic barcode as claimed in claim 1, wherein when the smartphone generates a new dynamic barcode information, the old dynamic barcode information will be gone.

7. The implementation method for an identification system using dynamic barcode as claimed in claim 1, wherein when the identification agency compares the data read from the dynamic barcode, the generated three dynamic barcodes will be gone regardless of a result of the comparison.

8. The implementation method for an identification system using dynamic barcode as claimed in claim 1, wherein if the result of the identification process is a match, the server will send back an identification success message to the transaction end.

9. The implementation method for an identification system using dynamic barcode as claimed in claim 1, wherein if the result of the identification process is not a match, the server will send back an identification failure message to the transaction end.

10. The implementation method for an identification system using dynamic barcode as claimed in claim 1, wherein a same user can only undergo one identification process within a given period of time, regardless of the outcome of the identification.

11. The implementation method for an identification system using dynamic barcode as claimed in claim 1, wherein the generation of the identification barcode and the dynamic barcode proceeds in an offline mode.

12. The implementation method for an identification system using dynamic barcode as claimed in claim 1, wherein the dynamic barcode undergoes change after a pre-determined time period; and the pre-determined time period is equivalent to a timer as shown on the identification app.

13. The implementation method for an identification system using dynamic barcode as claimed in claim 1, wherein the identification barcode and the dynamic barcode generate a single line barcode after computation by an algorithm, facilitating easier access by the linear CCD or CMOS barcode reader.

\* \* \* \* \*